Figure 1:
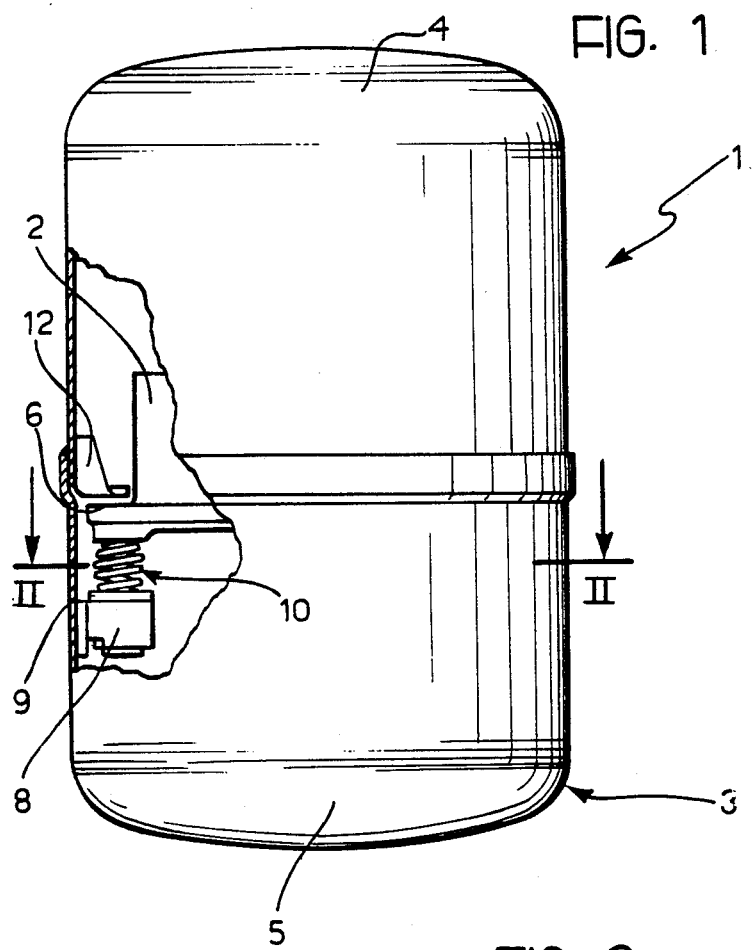

United States Patent [19]

Andrione et al.

[11] Patent Number: 4,549,859
[45] Date of Patent: Oct. 29, 1985

[54] SUSPENSION SYSTEM FOR HERMETIC MOTOR-COMPRESSORS OF REFRIGERATORS AND THE LIKE

[75] Inventors: Norbert Andrione; Federigo Peruzzi, both of Turin, Italy

[73] Assignee: Aspera S.p.A., Italy

[21] Appl. No.: 614,193

[22] Filed: May 25, 1984

[30] Foreign Application Priority Data

Jul. 12, 1983 [IT] Italy .............. 67754 A/83

[51] Int. Cl.⁴ .................. F04B 35/04; F16M 13/00; F16F 1/12
[52] U.S. Cl. ....................... 417/363; 417/902; 248/624; 267/179
[58] Field of Search ........... 417/363, 902; 248/624, 248/638, 603; 267/170, 179; 62/508, 295

[56] References Cited

U.S. PATENT DOCUMENTS

| | | | |
|---|---|---|---|
| 2,069,767 | 2/1937 | McCormack | 417/363 |
| 2,130,835 | 9/1938 | Bixler | 417/363 |
| 2,463,035 | 3/1949 | Heitchue | 417/902 |
| 2,801,045 | 7/1957 | Philipp | 417/363 |
| 3,065,901 | 11/1962 | Neubauer | 417/363 |
| 3,169,757 | 2/1965 | Röder et al. | 267/170 |
| 3,185,389 | 5/1965 | Loberg | 267/170 |
| 3,578,279 | 5/1971 | Scheldorf | 417/363 |
| 3,689,203 | 9/1972 | Vaughn | 417/363 |
| 3,820,921 | 6/1974 | Thayer | 417/902 |

Primary Examiner—Cornelius J. Husar
Assistant Examiner—Peter M. Cuomo
Attorney, Agent, or Firm—Sughrue, Mion, Zinn, Macpeak and Seas

[57] ABSTRACT

A suspension system for hermetic motor-compressors in which a motor-compressor unit is located in a casing formed by two superimposed cup-shaped bodies connected together in a frontal mating position. The motor-compressor unit has at least three radial support arms, each with an aperture at its free end which is oriented in an axial direction relative to the casing. Tubular support brackets are fixed to the side wall of that cup-shaped body acting as the lower portion of the casing in positions corresponding to the free ends of the said arms, each of the brackets carrying within it a bush of plastics material with a cavity which is aligned axially with the aperture of the overlying support arm. The bushes house resilient suspension elements, each of which is lodged at its upper end in the aperture of one of the support arms.

8 Claims, 11 Drawing Figures

SUSPENSION SYSTEM FOR HERMETIC MOTOR-COMPRESSORS OF REFRIGERATORS AND THE LIKE

DESCRIPTION

The present invention relates to suspension systems for hermetic motor-compressors of refrigerators and the like, and is particularly concerned with a suspension system for hermetic motor-compressors in which a motor-compressor unit is located within a casing formed by two superimposed cup-shaped bodies connected together in a frontal mating position.

The system according to the invention is characterised in that:

the motor-compressor unit has at least three radial support arms, each of which has a vertically-oriented aperture at its free end, tubular support brackets are fixed to the side wall of that cup-shaped body acting as the lower portion of the casing in positions corresponding to the free ends of the arms, each bracket carrying within it a bush of plastics material with a cavity which is aligned axially with the aperture of the overlying support arm, and resilient suspension elements are housed in the bushes, each of which is lodged at its upper end in the aperture of one of the support arms.

By virtue of this characteristic, there is provided a suspension system for hermetic motor-compressors which is simple and economical to manufacture.

Figure 2:
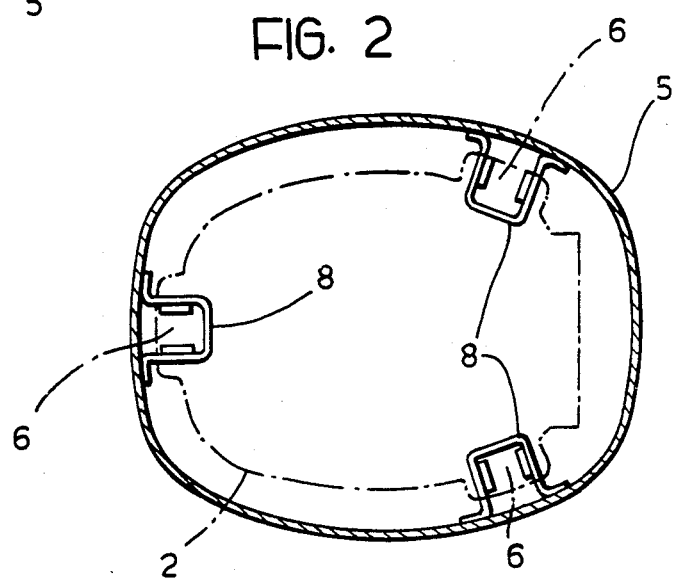
Figure 3:
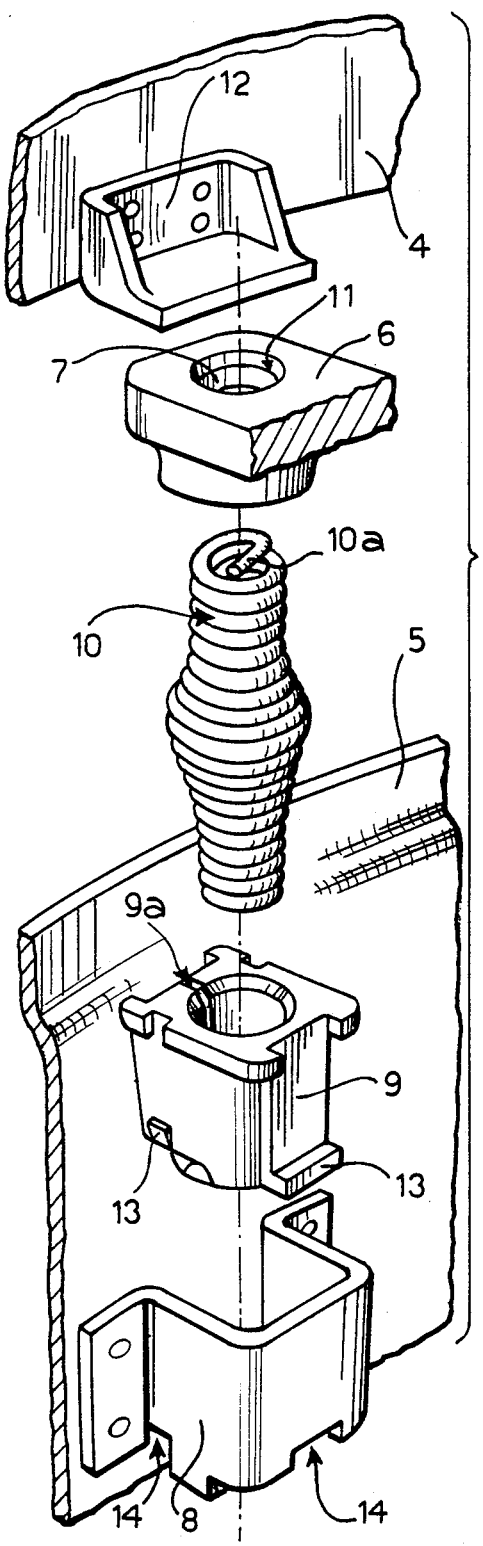
Figure 5:
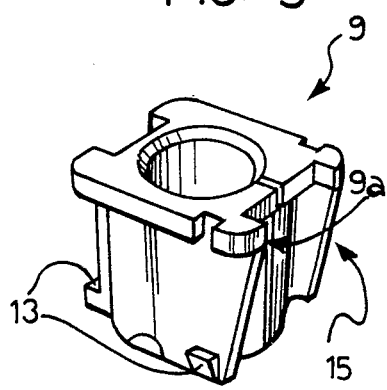
Figure 4:
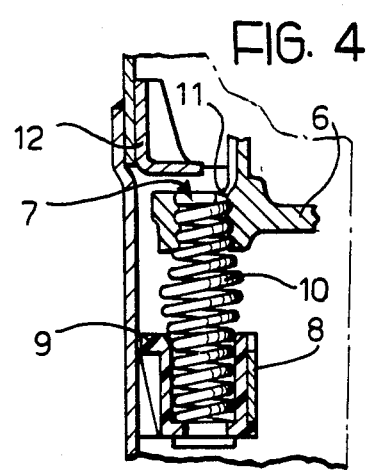
Figure 6:
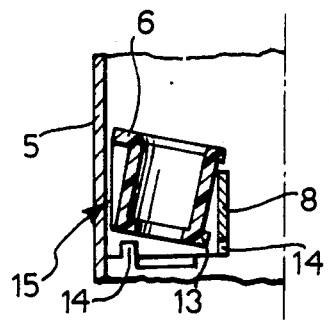

The invention will now be described, purely by way of non-limiting example, with reference to the appended drawings, in which:

FIG. 1 is a partially cut-away side elevational view of a hermetic motor-compressor provided with a suspension system according to the invention, FIG. 2 is a section taken on the line II—II of FIG. 1, from which several elements have been omitted for simplicity, FIG. 3 is an exploded view of part of the suspension system according to the invention, FIG. 4 is a vertical sectional view of the elements illustrated in FIG. 3 in their assembled position, FIGS. 5 and 6 illustrate the features of several elements illustrated in FIGS. 3 and 4 in greater detail, and FIGS. 7 to 11 illustrate a variant of the invention, In the drawings, a hermetic motor-compressor, generally indicated 1, is intended for use in a refrigerator or a similar appliance.

The Motor-compressor 1 is constituted essentially by a motor-compressor unit 2 (only partially visible in FIG. 1) and a hermetic casing indicated 3.

The casing 3 is constituted by two superimposed cup-shaped bodies 4, 5 connected and sealed together along their mutually facing free edges.

Three support arms 6 are shown which extend horizontally and radially from the motor-compressor unit 2.

The ends of these arms, only one of which is visible in the drawings, extend into proximity with the side wall of the casing 3 and are each provided with a vertically-oriented aperture 7.

Three tubular brackets 8 are fixed, preferably by projection welding, to the side wall of the cup-shaped body 5 defining the lower part of the casing 3.

The brackets 8, which have a general Ω shape, are angularly spaced from each other so that (as shown schematically in FIG. 2) each of them is in an angular position corresponding to the angular position of one of the arms 6 which support the motor-compressor unit 2.

Within each bracket 8 is a bush 9 of plastics material such as, for example, polytetrafluoroethylene.

Within the bush 9, the cavity of which is axially aligned with the aperture 7 of the overlying support arm 6 (FIG. 3), is housed a helical spring 10 which acts as the resilient suspension member between the bracket 8 and the arm 6.

The wall of the aperture 7 has threading 11 with characteristics complementary to the outer profile of the upper end of the spring 10.

Thus, the arrangement is such that, upon assembly of the motor-compressor 1, the springs 10 may be screwed into the apertures 7 so as to be firmly connected to the arms 6. To facilitate the screwing, the springs 10 have entrainment lugs 10a at their upper ends.

The motor-compressor unit may thus bear on the brackets 8, the lower ends of the springs 10 being introduced into the bushes 9.

In order to avoid the arms 6 rising excessively and pulling the springs 10 from the bushes 9 during transport or operation of the motor compressor, three further brackets 12 are fixed, preferably by projection welding, to the side wall of the cup-shaped body 4 forming the upper part of the casing 3 so as to limit the movement of the arms 6 away from the support brackets 8.

Thus, the possibility of effectiveness of the suspension device compromised as a result of accidental movement of its constituent elements is avoided.

For the same purpose, the bushes 9, which have an approximately parallelepipedal external shape, have three tooth-shaped projections 13 for cooperating with notches 14 formed in the edges of the brackets 8 opposite the support arms 6. On its side intended to face towards the casing 3, the wall of each bush 9 is interrupted by an axially-oriented slot 9a. The bushes are thus able to contract resiliently so as to allow their snap-engagement within the brackets 8. In this way, the bushes 9 are locked in their assembled position. Moreover, two of the projections 13 are located on the sides of the bushes 9 intended to face the wall of the casing 3 and are thus adjacent the slots 9a. The other projections 13, however, are on the sides of the bushes intended to face inwardly of the casing 3. The arrangement is thus such that, in order to remove the bushes 9 from the brackets 8, it is necessary to remove the bushes 9 slightly inwardly of the casing 3, as shown schematically in FIG. 6.

This moving-back is imposed on the bushes 9 when they are introduced into the brackets 8 during assembly of the motor-compressor 1. In order to facilitate this operation, the bushes 9 have a triangular outer bevel 15 on the face intended to face towards the wall of the casing 3.

The angular orienting movement of the bushes 9 is prevented, however when the springs 10 which support the arms 6 are introduced into the bushes 9.

Preferably, the dimensions of the cavities of the bushes 9 and the lower ends of the springs 10 are selected so as to achieve a loose coupling which avoids the transmission of axial forces between each spring 10 and its respective housing bush 9.

Each spring 10 also has a considerably swollen outline in its intermediate portion intended to fulfill the function of the suspension member proper. This shape gives the suspension system good resilience while, at the same time, preserving a certain rigidity of the ends of the springs 10 intended to cooperate with the arms 6 and the bushes 9.

FIGS. 7 to 11 relate to a variant of the invention, parts identical to those already illustrated being indicated by the same reference numerals as those used in FIGS. 1 to 6. References increased by 100 however, are, used to indicate other embodiments of parts whose function has been described above.

More particularly, Ω-shaped brackets, indicated 108, are projection welded to the side wall of the body 5. The projecting part of each of these brackets is approximately cylindrical in shape and can accommodate a tubular bush 109 of plastics material, such as tetrafluoroethylene.

In substantially the same manner as the bushes 9, the bushes 109 (of which one is illustrated in detail in FIGS. 8 to 10) also has an axial slot 109a which enables the resilient contraction of the bushes 109 to allow their insertion into the brackets 108.

Again in this case, the snap-engagement of each bush 109 in the bracket 108 is achieved in a disposition in which the slot 109 faces the wall of the body 5 and at least one pair of projections 113, in the form of stop teeth, bears against the edge of the respective bracket 108 in order to prevent the removal of the bush from its assembled position.

The walls of the apertures of the bushes 109 have threadings 11 having characteristics complementary to the outer profiles of the lower ends of the springs 10.

In the variant illustrated in FIGS. 7 to 11, the springs 10 are thus able to be screwed into the bushes 109. The upper ends of the springs, however, are freely engaged (that is to say, without screwing) within the vertical axis apertures provided at the ends of the arms 6. These apertures, indicated 107, have a smooth inner wall by which they differ from the apertures 7 of FIGS. 3 to 6.

Figure 7:
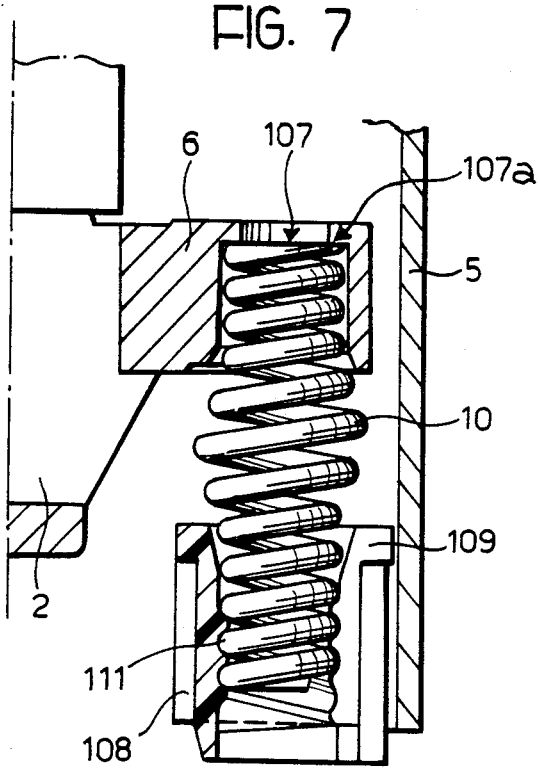

FIG. 7 illustrates an aperture 107 having a shoulder 107a defining an axial bearing surface for a spring at its end opposite the springs 10.

Figure 11:
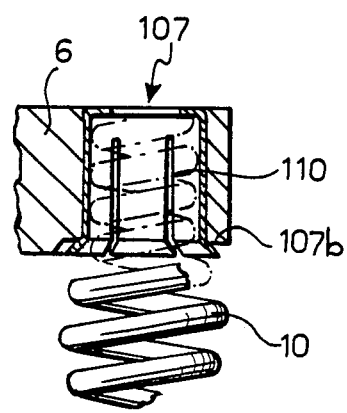
Figure 8:
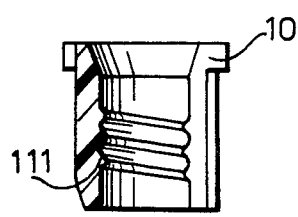
Figure 10:
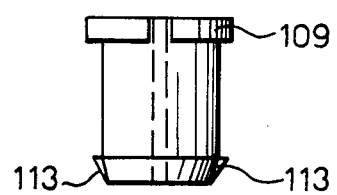
Figure 9:
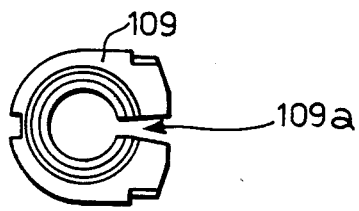

In FIG. 11, however, there is illustrated an embodiment in which the shoulder 107a is absent. The aperture 107 in this case has a flared mouth 107b and houses a cup-shaped lining 110 the free edge of which has an enlargement (flare) having characteristics complementary to those of the mouth 107b. The lining 110 thus acts as a thrust transmission element between the spring 10 and the arm 6.

The screwing of the springs 10 into the bushes 109 is the currently preferred solution for the assembly of the compressor. Indeed, the screwing allows the precise regulation of the height of the portion of spring projecting from the bush 109. This is useful both for achieving perfect horizontal alignment of the upper ends of the springs and for adjustment of the length of the free portions of the springs in dependence on the distribution (usually uneven) of the weight of the motor-compressor unit 2 on the arms 6.

We claim:

1. A hermetic motor-compressor comprising a casing formed by upper and lower super-imposed cup-shaped bodies having sidewalls with the sidewalls connected together in a frontal mating position to define a hollow chamber, a motor-compressor unit disposed within said casing and a suspension system for resiliently supporting said unit within said casing; said suspension system comprising at least three radially directed support arms extending from said motor compressor unit with each arm having a free end with a vertically oriented aperture therein, tubular support brackets secured to the sidewall of said lower body at locations corresponding to the free end of each arm, a bush of plastic material having a cavity therein secured within each tubular support bracket with said cavity axially aligned with said aperture of the support arm overlying said bracket, helical springs each having an upper end and a lower end with the upper end of each helical spring being lodged in the aperture of a respective support arm and internal threads formed in the cavity of each bush into which the lower end of each helical spring is threaded.

2. A suspension system according to claim 1 wherein a cup-shaped lining is disposed in each aperture at the end of each radially directed arm of the motor compressor unit for receiving and locking the upper ends of said springs.

3. A suspension system according to claim 1 wherein the helical springs have intermediate portions with a larger diameter than the ends of said springs.

4. A suspension system according to claim 1 wherein additional brackets are secured to the sidewall of said upper cup-shaped body in correspondence with said support brackets on said lower cup-shaped body to act as stop members for limiting the movement of said arms away from said support brackets.

5. A suspension system according to claim 1 wherein said brackets are fixed to said casing by projection welding.

6. A suspension system according to claim 4 wherein said additional brackets are secured to said casing by projection welding.

7. A suspension system according to claim 1 wherein each support bracket has a lower edge and each bush has a wall with tooth shaped projections thereon cooperating with said lower edge of said the respective support bracket and wherein said wall of each bush has apertures which give the wall a characteristic resilience such as to allow the snap-engagement of ech bush in a respective support bracket.

8. A suspension system according to claim 1 wherein said support brackets and said bushes secured therein are shaped so as to prevent the removal of said bushes from said brackets as a result of purely axial relative movement.

* * * * *